United States Patent Office 3,428,665
Patented Feb. 18, 1969

3,428,665
POLYCHLOROETHYL AND POLYCHLOROVINYL
ACYL MONO AND BISDISULFIDES
Paul C. Aichenegg, Prairie Village, Kans., and Carl D.
Emerson and Lawrence E. Gillen, Kansas City, Mo.,
assignors to Chemagro Corporation, New York, N.Y.,
a corporation of New York
No Drawing. Filed Aug. 23, 1965, Ser. No. 481,958
U.S. Cl. 260—453    19 Claims
Int. Cl. C07c *161/00;* A01n *9/12*

ABSTRACT OF THE DISCLOSURE

Compounds are prepared having one of the formulae

and

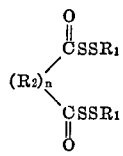

where R is selected from the group consisting of alkyl, haloalkyl, aryl, aralkyl, aryloxyalkyl, haloaryl, haloaralkyl and haloaryloxyalkyl; $R_1$ is selected from the group consisting of trihaloethyl, tetrahaloethyl, dihalovinyl and trihalovinyl; $R_2$ is selected from the group consisting of alkylene and phenylene and $n$ is selected from the group consisting of 0 and 1. The compounds are useful as fungicides, herbicides and nematocides.

The present invention relates to the preparation of novel disulfides and the pesticidal use thereof.

An object of the present invention is to prepare novel polyhaloethyl and polyhalovinyl acyl disulfides.

Another object is to develop improved compositions and processes for killing fungi.

An additional object is to develop improved compositions for killing undesired plants.

A further object is to develop improved defoliants.

Yet another object is to develop novel nematocides.

A still further object is to develop novel insecticides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the formulae

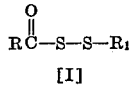

[I]

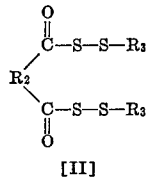

[II]

where R is selected from the group consisting of alkyl, haloalkyl, aryl, aralkyl, aryloxyalkyl, haloaryl, haloaralkyl, haloaryloxyalkyl; $R_1$ and $R_3$ are tri to tetrahaloethyl or di to trihalovinyl; and $R_2$ is nothing, alkylene or phenylene. The preferred halogen is chlorine and the next preferred is bromine.

For most uses the preferred compounds are those of Formula II where $R_2$ is lower alkylene.

It is critical that the polyhaloethyl groups have 3 to 4 halogen atoms since if there are only 1 or 2 halogen atoms the compounds have undesirable vesicant properties which greatly reduce their availability for commercial use. The trihaloethyl compounds usefully have better pesticidal properties than the tetrahaloethyl compounds.

The monochlorovinyl compounds have the disadvantage of polymerizing too readily and hence also are undesirable.

As indicated in the objects, the compounds of the present invention are useful as herbicides, defoliants, insecticides, fungicides and nematocides.

Examples of compounds within the present invention are acetyl 1,2,2-trichloroethyl disulfide,
acetyl 1,2,2-tribromoethyl disulfide,
acetyl 2,2,2-trichloroethyl disulfide,
acetyl 1,2,2,2-tetrachloroethyl disulfide,
acetyl 1,2-dichlorovinyl disulfide,
acetyl 2,2-dichlorovinyl disulfide,
acetyl 2,2-dibromovinyl disulfide,
acetyl perchlorovinyl disulfide,
propionyl 1,2,2-trichloroethyl disulfide,
propionyl 2,2,2-trichloroethyl disulfide,
propionyl 1,2,2,2-tetrachloroethyl disulfide,
propionyl 1,2,2,2-tetrabromoethyl disulfide,
propionyl 1,2-dichlorovinyl disulfide,
propionyl 1,2-dibromovinyl disulfide,
propionyl 2,2-dichlorovinyl disulfide,
propionyl perchlorovinyl disulfide,
butyryl 1,2,2-trichloroethyl disulfide,
butyryl 2,2,2-trichloroethyl disulfide,
butyryl 1,2,2,2-tetrachloroethyl disulfide,
butyryl 1,2-dichlorovinyl disulfide,
butyryl 2,2-dichlorovinyl disulfide,
butyryl perchlorovinyl disulfide,
valeryl 1,2,2-trichloroethyl disulfide,
valeryl 2,2,2-trichloroethyl disulfide,
valeryl 1,2-dichlorovinyl disulfide,
valeryl 2,2-dichlorovinyl disulfide,
valeryl perchlorovinyl disulfide,
caproyl 1,2,2-trichloroethyl disulfide,
caproyl 2,2,2-trichloroethyl disulfide,
caproyl 1,2,2,2-tetrachloroethyl disulfide,
caproyl 1,2-dichlorovinyl disulfide,
caproyl 2,2-dichlorovinyl disulfide,
caproyl percholorovinyl disulfide,
stearoyl 1,2,2-trichloroethyl disulfide,
stearoyl 2,2-dichlorovinyl disulfide,
benzoyl 1,2,2-trichloroethyl disulfide,
benzoyl 2,2,2-trichloroethyl disulfide,
benzoyl 1,2,2,2-tetrachloroethyl disulfide,
benzoyl 1,2,2-tribromoethyl disulfide,
benzoyl 1,2-dichlorovinyl disulfide,
benzoyl 2,2-dichlorovinyl disulfide,
benzoyl perchlorovinyl disulfide,
2,4-dichlorobenzoyl 1,2,2-trichloroethyl disulfide,
2,4-dichlorobenzoyl 2,2,2-trichloroethyl disulfide,
2,4-dichlorobenzoyl 1,2,2,2-tetrachloroethyl disulfide,
2,4-dichlorobenzoyl 1,2-dichlorovinyl disulfide,
2,4-dichlorobenzoyl 2,2-dichlorovinyl disulfide,
2,4-dichlorobenzoyl perchlorovinyl disulfide,
2,4-dibromobenzoyl 2,2-dichlorovinyl disulfide,
2-chlorobenzoyl 1,2,2-trichloroethyl disulfide,
3-chlorobenzoyl 2,2,2-trichloroethyl disulfide, 4-chlorobenzoyl 1,2-dichlorovinyl disulfide,
3-chlorobenzoyl 2,2-dichlorovinyl disulfide,
2,4,5-trichlorobenzoyl 1,2,2-trichloroethyl disulfide,
2,4,5-trichlorobenzoyl 2,2,2-trichloroethyl disulfide,
2,4,5-trichlorobenzoyl 1,2,2,2-tetrachloroethyl disulfide,
2,4,5-trichlorobenzoyl 1,2-dichlorovinyl disulfide,
2,4,5-trichlorobenzoyl 2,2-dichlorovinyl disulfide,
2,4,5-trichlorobenzoyl perchlorovinyl disulfide,
phenylacetyl 1,2,2-trichloroethyl disulfide,
phenylacetyl 2,2,2-trichloroethyl disulfide,
phenylacetyl 1,2,2,2-tetrachloroethyl disulfide,
phenylacetyl 1,2-dichlorovinyl disulfide,
phenylacetyl 2,2-dichlorovinyl disulfide,
phenylacetyl perchlorovinyl disulfide,
phenyl propionyl 2,2,2-trichloroethyl disulfide,
phenyl propionyl 1,2-dichlorovinyl disulfide,
2,4-dichlorophenylacetyl 1,2,2-trichloroethyl disulfide,
2,4-dichlorophenylacetyl 2,2,2-trichloroethyl disulfide,
2,4-dichlorophenylacetyl 1,2,2,2-tetrachloroethyl disulfide,
2,4-dichlorophenylacetyl 1,2-dichlorovinyl disulfide,
2,4-dichlorophenylacetyl 2,2-dichlorovinyl disulfide,
2,4-dichlorophenylacetyl perchlorovinyl disulfide,
phenoxyacetyl 1,2,2-trichloroethyl disulfide,
phenoxyacetyl 2,2,2-trichloroethyl disulfide,
phenoxyacetyl 1,2,2,2-tetrachloroethyl disulfide,
phenoxyacetyl 1,2-dichlorovinyl disulfide,
phenoxyacetyl 2,2-dichlorovinyl disulfide,
phenoxyacetyl perchlorovinyl disulfide,
2,4-dichlorophenoxyacetyl 1,2,2-trichloroethyl disulfide,
2,4-dichlorophenoxyacetyl 2,2,2-trichloroethyl disulfide,
2,4-dichlorophenoxyacetyl 1,2,2,2-tetrachloroethyl disulfide,
2,4-dichlorophenoxyacetyl 1,2-dichlorovinyl disulfide,
2,4-dichlorophenoxyvyacetyl 2,2-dichlorovinyl disulfide,
2,4-dichlorophenoxyacetyl perchlorovinyl disulfide,
2-methyl-4-chlorophenoxyacetyl 1,2,2,2-tetrachloroethyl disulfide,
2-methyl-4-chlorophenoxyacetyl 2,2-dichlorovinyl disulfide,
4-methylbenzoyl 1,2-dichlorovinyl disulfide,
3-methylbenzoyl 1,2,2-trichloroethyl disulfide,
2-methyl-4-chlorobenzoyl 2,2,2-trichloroethyl disulfide,
2-methyl-4-chlorobenzoyl 2,2-dichlorovinyl disulfide,
trichloroacetyl 1,2,2-trichloroethyl disulfide,
trichloroacetyl 2,2,2-trichloroethyl disulfide,
trichloroacetyl 1,2,2,2-tetrachloroethyl disulfide,
trichloroacetyl 1,2-dichlorovinyl disulfide,
trichloroacetyl 2,2-dichlorovinyl disulfide,
trichloroacetyl perchlorovinyl disulfide,
tribromoacetyl 1,2,2-tribromoethyl disulfide,
tribromoacetyl perchlorovinyl disulfide,
oxalyl bis(1,2,2-trichloroethyl disulfide),
oxalyl bis(2,2,2-trichloroethyl disulfide),
oxalyl bis(1,2,2,2-tetrachloroethyl disulfide),
oxalyl bis(1,2-dichlorovinyl disulfide),
oxalyl bis(2,2-dichlorovinyl disulfide),
oxalyl bis(perchlorovinyl disulfide),
oxalyl bis(1,2,2-tribromoethyl disulfide),
oxalyl bis(2,2-dibromovinyl disulfide),
malonyl bis(1,2,2-trichloroethyl disulfide),
malonyl bis(2,2,2-trichloroethyl disulfide),
malonyl bis(1,2,2,2-tetrachloroethyl disulfide),
malonyl bis(1,2-dichlorovinyl disulfide),
malonyl bis(2,2-dichlorovinyl disulfide),
malonyl bis(perchlorovinyl disulfide),
malonyl bis(1,2,2,2-tetrabromoethyl disulfide),
malonyl bis(perbromovinyl disulfide),
succinyl bis(1,2,2,2-tetrachloroethyl disulfide),
succinyl bis(1,2,2-trichloroethyl disulfide),
succinyl bis(2,2,2-trichloroethyl disulfide),
succinyl bis(1,2-dichlorovinyl disulfide),
succinyl bis(2,2-dichlorovinyl disulfide),
succinyl bis(perchlorovinyl disulfide),
glutaryl bis(1,2,2-trichloroethyl disulfide),
glutaryl bis(2,2-dichlorovinyl disulfide),
adipyl bis(2,2,2-trichloroethyl disulfide),
adipyl bis(1,2-dichlorovinyl disulfide),
terephthalyl bis(1,2,2-trichloroethyl disulfide),
terephthalyl bis(2,2,2-trichloroethyl disulfide),
terephthalyl bis(1,2,2,2-tetrachloroethyl disulfide),
terephthalyl bis(1,2-dichlorovinyl disulfide),
terephthalyl bis(2,2-dichlorovinyl disulfide),
terephthalyl bis(perchlorovinyl disulfide),
phthalyl bis(perchlorovinyl disulfide),
phthalyl bis(1,2,2,2-tetrachloroethyl disulfide),
isophthalyl bis(1,2,2-trichloroethyl disulfide),
isophthalyl bis(1,2-dichlorovinyl disulfide).

The compounds of the present invention are readily obtained by reacting the appropriate thiol acid with the appropriate sulfenyl chloride, usually in an inert organic solvent, with the removal of the gaseous HCl formed according to the procedure

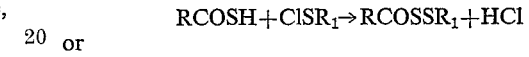

or

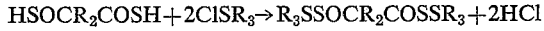

In those cases where the thiol acids are of considerable instability in their free state, their metal, e.g., sodium or potassium, or ammonium salts can easily be reacted with the corresponding sulfenyl chlorides and the metal chloride or ammonium chloride formed readily removed from the desired organic reaction product.

The thiol acid or salt starting materials are best made in known manner from the carboxylic acids via the acid chlorides followed by conversion with hydrogen sulfide gas or with alkali sulfides, e.g., sodium sulfide or potassium hydrosulfide. Thus the acyl chloride can be reacted with hydrogen sulfide in the presence of aluminum chloride, see Cunneen, Journal of the Chemical Society (London), 1947, page 141; or the acyl chloride can be reacted with hydrogen sulfide in the presence of pyridine, see Arnat, Berichte, 1939, volume 63, page 2390; or the acyl halide can be reacted with sodium sulfide or potassium hydrosulfide, see Sumner, Svensk. Kem. Tia, 1942, volume 54, pages 163–167.

As a general rule the products of the present invention are oils of colorless to yellow appearance and do not possess obnoxious odors. They do not have vesicant properties and the vinyl compounds are not readily polymerized.

Unless otherwise indicated all parts and percentages are by weight.

The general procedure employed for preparing the acyl disulfides of the present invention was to dissolve 0.1 mole of the appropriate thiol acid (or salt thereof) in 3 volumes of dry chloroform (or other inert solvent) and slightly less (for water soluble acids) or slightly more (for water insoluble acids) than the calculated amount of 0.1 mole of the appropriate sulfenyl chloride was added dropwise with stirring, applying dry nitrogen stream and such temperature on a steam bath as to maintain a slow but steady distillation rate of the solvent and gaseous HCl. At the end of the addition period (20–60 minutes) the distillation rate of the volatile products was increased by a higher flow rate of the nitrogen gas.

If an excess of a water soluble thiol acid was originally used, the resulting chloroform solution (after all the HCl had been removed) was washed with water until neutral, the organic layer dried over anhydrous magnesium sulfate and the solvent removed, finally in high vacuum.

In those cases in which a slight excess of the sulfenyl chloride was employed, the chloroform solution was stripped in the nitrogen stream directly followed by treatment in high vacuum to remove all volatiles (including a small excess of the sulfenyl chloride).

In practically all cases, distillation of the products of the invention themselves could not be employed due to extensive decompositions occurring during the distillation.

The products, however, were characterized by elemental analysis, physical properties and IR scans.

Many of the intermediate thiol acids or thiol acid chlorides are commercially available and these commercial products were used. Others, however, were prepared using the procedures indicated above. Representative examples of the preparation of such intermediates are given below.

EXAMPLE A (a) Dry hydrogen sulfide gas was introduced into 100 grams (0.55 mole) of trichloroacetyl chloride containing 2 grams of powdered aluminum chloride in dispersion. Cooling to maintain a 0° C. reaction temperature and fast stirring for dispersion of the hydrogen sulfide gas was maintained over a period of approximately four hours, at the end of which no more hydrogen chloride was given off. Direct distillation at 10 mm. Hg gave 68 grams (89% yield) of trichlorothiol acetic acid, $n_D^{27}$ 1.5253, (b) Trichlorothiol acetic acid was also prepared by dissolving 15 grams (0.125 mole+50% excess) of pyridine in 100 ml. of chloroform, cooling to 0–10° C. and saturating with hydrogen sulfide gas. 22.7 grams (0.125 mole) of trichloroacetyl chloride were then added dropwise with stirring and continued introduction of hydrogen sulfide at 10–12° C. was carried out over a period of approximately 45 minutes, the mixture allowed to warm to room temperature, washed twice with a solution of 30 grams of sodium sulfate in 100 ml. of water containing 5 grams of concentrated sulfuric acid and then with saturated sodium chloride solution, dried over anhydrous magnesium sulfate, the solvent removed and vacuum distillation employed to give 13.3 grams (59% yield) of trichlorothiol acetic acid, B.P. 55–56° C. at 12 mm., $n_D^{25}$ 1.5270.

EXAMPLE B 63.5 grams (0.5 mole) of oxalyl chloride were added dropwise with stirring and cooling at 10–15° C. to 62 grams (1 mole) of ethyl mercaptan over a period of 30 minutes. When the vigorous HCl evolution subsided, the mixture was warmed slowly and held at 40–45° C. for one hour. The resulting product was evacuated to remove all volatiles to obtain 79.5 grams (90% yield) of bis-(ethylthiol)oxalate which crystallized in the form of large yellow needles. Purification by recrystallizing from ethyl alcohol gave yellow crystals, M.P. 27–20° C.

26.4 grams of 85% KOH (0.4 mole) were dissolved in 300 ml. of absolute ethyl alcohol and the solution saturated with dry $H_2S$ gas at 25–30° C. with occasional cooling. 35.6 grams (0.2 mole) of the bis(ethylthiol) oxalate in 100 ml. of ethyl alcohol were then added to the ethanolic KHS solution at 25–30° C. over a period of ½ hour. A white precipitate soon began to form accompanied by the formation of ethyl mercaptan. The mixture was stirred for an additional 2 hours at room temperature and allowed to stand overnight. Filtration, washing twice with fresh portions of absolute ethyl alcohol followed by drying in vacuum gave 40 grams (quantitative yield) of the desired bis(potassiumthiol)oxalate as a white crystalline solid having the formula

COSK
|
COSK

EXAMPLE C 50 grams (0.354 mole) of malonyl chloride were added at 25–30° C. to 66 grams (excess over 1.0 mole) of ethyl mercaptan with stirring and cooling. Standing overnight and removing of all volatiles in vacuum gave 68 grams (quantitative yield) of pure bis(ethylthiol)-malonate, $n_D^{25}$ 1.5185. The procedure of Example B was followed employing 32.2 grams (0.5 mole) of 85% KOH in 150 ml. of ethyl alcohol saturated with $H_2S$ and 48 grams (0.25 mole) of the bis(ethylthiol)malonate. Standing overnight, filtration and washing with fresh ethyl alcohol gave, after vacuum drying, 48 grams (90% yield) of bis(potassiumthiol)malonate having the formula

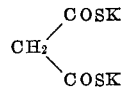

EXAMPLE D 77.5 grams (0.5 mole) of succiniyl chloride were added dropwise to 62 grams (1.0 mole) of ethyl mercaptan at reflux temperature (34° C.). During the one hour addition period, heavy evolution of HCl gas took place. One hour's warming to 40–45° C. and vacuum stripping gave 102.2 grams (99% yield) of bis(ethylthiol)succinate. 26.4 grams (0.4 mole) of 85% KOH in 300 ml. of absolute ethyl alcohol were saturated with $H_2S$ gas at 30° C. for approximately 1 hour. A solution of 41.2 grams (0.2 mole) of the bis(ethylthiol)succinate in 50 ml. of ethyl alcohol were then added dropwise. The mixture was then warmed to 50–55° C. and the reaction continued for approximately 1 hour. The solid salt formed rapidly and considerable evolution of ethyl mercaptan took place. The reaction was allowed to proceed for a further ½ hour at 55° C. The mixture was brought to room temperature, filtered and the salt washed twice with fresh ethyl alcohol and dried in vacuum to give 29.5 grams (65% yield) of bis(potassiumthiol)succinate.

EXAMPLE E 2,4-dichlorothiolbenzoic acid was made from 2,4-dichlorobenzoyl chloride using the procedure of Example A(b).

EXAMPLE F

To 2.5 grams (0.1 mole) of grease free magnesium metal filings in 200 ml. of dry ether there were added dropwise with stirring and occasional cooling at 30° C. 20.5 grams (0.1 mole) of 2,4-dichlorobenzyl chloride and stirring was contined for five hours. Dry COS gas was then introduced into the filtered ether solution at 5–7° C. for approximately 4 hours. Toward the end of the reaction a solid came down. The whole mixture was then poured into 100 ml. of water containing 15 grams of concentrated sulfuric acid with vigorous agitation. The formed oil was taken up by extraction of the aqueous mixture with diethyl ether, the obtained solution dried over magnesium sulfate and stripped. 16.5 grams (75% yield) of 2,4-dichlorophenylthiol acetic acid as a yellow oil were obtained.

EXAMPLE G

Phenoxythiol acetic acid was prepared from phenoxyacetyl chloride using the procedure of Example A(b).

EXAMPLE H 2,4-dichlorophenoxythiol acetic acid was prepared from 2,4-dichlorophenoxyacetyl chloride using the procedure of Example A(b).

EXAMPLE I 2-methyl-4-chlorophenoxythiol acetic acid was prepared from 2-methyl-4-chlorophenoxyacetyl chloride using the procedure of Example A(b).

EXAMPLE 1

Acetyl-1,2,2-trichloroethyl disulfide 9. grams (0.1 mole) of thiolacetic acid were dissolved in 50 ml. of dry chloroform and reacted with 20 grams (0.1 mole) of 1,2,2-trichloroethyl sulfenyl chloride by dropwise addition with stirring at 30–35° C. under a slightly reduced pressure in order to remove gaseous HCl more rapidly. After 2 hours the product was water washed until free of acid, dried over anhydrous magnesium sulfate and stripped in a high vacuum to give 23 grams (96% yield) of acetyl-1,2,2-trichloroethyl disulfide as an almost colorless oil, $n_D^{20}$ 1.5763, which darkened on standing over long periods of time, percent Cl 43.3 (theory 44.4%), percent S 27.3 (theory 26.8).

EXAMPLE 2

Acetyl-2,2,2-trichloroethyl disulfide 15.2 grams (0.2 mole) of thiol acetic acid, when dissolved in 50 ml. of dry chloroform and reacted with 40 grams (0.2 mole) of 2,2,2-trichloroethyl sulfenyl chloride in the manner described in Example 1 at 20–25° C. gave after direct removing of the solvent by stripping in high vacuum 47.0 grams (97% yield) of acetyl-2,2,2-trichloroethyl disulfide as an almost colorless oil, $n_D^{30}$ 1.5650.

EXAMPLE 3

Acetyl-1,2,2,2-tetrachloroethyl disulfide 50 grams (0.5 mole, 4–5% excess) of thiolacetic dissolved in 50 ml. chloroform and reacted with 117 grams (0.5 mole) of 1,2,2,2-tetrachloroethyl sulfenyl chloride by dropwise with stirring at 30–35° C. gave after two water and one sodium bicarbonate wash, drying over magnesium sulfate and stripping 115 grams (84% yield) of acetyl-1,2,2,2-tetrachloroethyl disulfide as a reddish oil, $n_D^{25}$ 1.5775.

EXAMPLE 4

Acetyl-1,2-dichlorovinyl disulfide 23.95 grams (0.1 mole) of acetyl-1,2,2-trichloroethyl disulfide were dissolved in 75 ml. of dry benzene, cooled to 10–20° C. and 10.3 grams of triethylamine were added dropwise with stirring and cooling at 20–25° C. After standing for a further 2 hours at room temperature and filtration the benzene solution was washed with dilute HCl, twice with water and finally dried over anhydrous magnesium sulfate and stripped to give 18.5 grams (91% yield) of acetyl-1,2-dichlorovinyl sulfide as a dark oil, percent Cl 35.1 (theory 34.9%).

EXAMPLE 5

Acetyl-2,2-dichlorovinyl disulfide

To 14.2 grams (0.2 mole) of thiol acetic acid diluted with 50 ml. of chloroform, 32.6 grams (0.2 mole) of 2,2-dichlorovinyl sulfenyl chloride were added dropwise with stirring at 10° C. Standing overnight and direct evaporation in high vacuum gave 38 grams (94% yield) of acetyl-2,2-dichlorovinyl disulfide as a dark oil, $n_D^{30}$ 1.5865.

EXAMPLE 6

Acetyl-perchlorovinyl disulfide (a) 27.4 grams (0.1 mole) of acetyl-1,2,2,2-tetrachloroethyl disulfide were diluted with 100 ml. of dry benzene and 10.1 gram (0.1 mole) of triethylamine diluted with 10 ml. of benzene added dropwise with stirring and cooling at 15–20° C. Standing at room temperature for 48 hours, filtration, washing free of triethylamine hydrochloride and unreacted triethylamine and finally drying over anhydrous magnesium sulfate and vacuum stripping gave 21 grams (90% yield) of acetyl-perchlorovinyl disulfide as a dark heavy oil which on distillation gave 7.5 grams of the pure compound, $n_D^{25}$ 1.6018, B.P. at 0.02 mm., 100° C.

(b) 3.8 grams (0.05 mole) of thiol acetic acid were added dropwise to 9.9 grams (0.05 mole) of perchlorovinyl sulfenyl chloride in 100 ml. of dry chloroform at 30° C. while a stream of dry nitrogen provided satisfactory agitation and a means to remove an excessive accumulation of gaseous HCl in the reaction mixture. Toward the end of the acid introduction, the solution turned from dark red-orange to faintly yellow. Removing the solvent in high vacuum gave 11.6 grams (98% yield) of acetyl-perchlorovinyl disulfide as a yellow oil, percent Cl 45.4 (theory 44.7%), percent S 27.0 (theory 26.8%). The IR spectrum of the product of Example 6(b) was identical with that of the product of Example 6(a).

EXAMPLE 7

Propionyl-1,2,2-trichloroethyl disulfide 9.0 grams (0.1 mole) of thiolpropionic acid were dissolved in 50 cc. of dry chloroform and 20 grams (0.1 mole) of 1,2,2-trichloroethyl sulfenyl chloride added dropwise with stirring and cooling at 35–40° C. After addition of the reagent was complete (30 minutes) the mixture was allowed to stand for 30 minutes at room temperature. The chloroform solution was poured into 1 volume of dilute sodium bicarbonate solution, washed 3 times with water, dried over anhydrous magnesium sulfate and evaporated in high vacuum to give 19.3 grams (78% yield) of propionyl-1,2,2-trichloroethyl disulfide, $n_D^{25}$ 1.5661, percent Cl 41.1 (theory 42.0%), percent S 24.6 (theory 25.3%).

EXAMPLE 8

Propionyl-2,2,2-trichloroethyl disulfide 9.0 grams (0.1 mole) of thiol propionic acid dissolved in 50 cc. of chloroform was reacted with 20 grams (0.1 mole) of 2,2,2-trichloroethyl sulfenyl chloride by dropwise addition with stirring at 35–40° C. to give after a 2 hour standing period at room temperature, washing with dilute $NaHCO_3$ and water, drying over anhydrous $MgSO_4$ and high vacuum stripping, 23.0 grams (91% yield) of propionyl-2,2,2-trichloroethyl disulfide as a yellow oil, $n_D^{25}$ 1.5609.

EXAMPLE 9

Butyryl-1,2,2-trichloroethyl disulfide 10.4 grams (0.1 mole) of thiolbutyric acid were diluted with 50 ml. of dry $CHCl_3$ and 20 grams (0.1 mole) of 1,2,2-trichloroethyl sulfenyl chloride were added with stirring and cooling at 35–40° C. Stirring was continued for a further 1 hour after the 30 minute addition period and the obtained chloroform solution poured into one volume of dilute $NaHCO_3$, washed three times with water, dried over anhydrous $MgSO_4$ and evaporated in high vacuum to give 24 grams (90% yield) of butyryl-1,2,2-trichloroethyl disulfide as a light yellow oil, percent Cl 39.2 (theory 39.9%), percent S 24.5 (theory 24.0%).

EXAMPLE 10

Butyryl-2,2,2-trichloroethyl disulfide 10.4 grams (0.1 mole) of thiolbutyric acid dissolved in 50 ml. of dry chloroform and reacted in the same way as described in Example 9 with 20 grams (0.1 mole) of 2,2,2-trichloroethyl sulfenyl chloride gave after a 2 hour stirring period at room temperature and washing with dilute $NaHCO_3$ and water, drying and stripping 24.5 grams (92% yield) of butyryl-2,2,2-trichloroethyl disulfide as a dark oil, $n_D^{25}$ 1.5555.

EXAMPLE 11

Trichloroacetyl-1,2,2,2-trichloroethyl disulfide 9 grams (0.05 mole) of trichloro thiolacetic acid were diluted with 75 ml. of dry $CHCl_3$ and 10 grams (0.05 mole) of 1,2,2,2-trichloroethyl sulfenyl chloride were added dropwise with stirring and cooling at 30–35° C. using a slow dry nitrogen stream to remove the gaseous HCl formed. The reaction was instantaneous and the resulting chloroform solution was evaporated in an accelerated stream of nitrogen. High vacuum treatment gave 15.2 grams (88% yield) of trichloroacetyl-1,2,2,2-trichloroethyl disulfide as a yellow oil, $n_D^{25}$ 1.5845, percent Cl 62.5 (theory 62.1%), percent S 18.5 (theory 18.7%).

EXAMPLE 12

Trichloroacetyl-2,2,2-trichloroethyl disulfide 9 grams (0.04 mole) of trichlorothiol acetic acid were diluted with 50 ml. of $CHCl_3$ and 10 grams (0.05 mole) of 2,2,2-trichloroethyl sulfenyl chloride were added dropwise with stirring and cooling at 30–35° C. After working up in the manner set forth in Example 11 there were obtained 16.7 grams (97% yield) of trichloroacetyl-2,2,2-trichloroethyl disulfide, $n_D^{25}$ 1.5785.

EXAMPLE 13

Trichloroacetyl-1,2,2,2-tetrachloroethyl disulfide 9 grams (0.05 mole) of trichlorothiol acetic acid were diluted with 75 ml. of dry chloroform and 11.7 grams (0.05 mole) of 1,2,2,2-tetrachloroethyl sulfenyl chloride added dropwise with stirring and cooling at 30–40° C. After the 20 minute addition period, 10 further minutes of stirring at room temperature completed the reaction. The gaseous HCl formed and the solvent were evaporated in a dry nitrogen stream and the residue finally treated in high vacuum to obtain 18.2 grams (97% yield) of trichloroacetyl-1,2,2,2-tetrachloroethyl disulfide as an orange oil, $n_D^{28}$ 1.5894, percent Cl 63.6 (theory 65.9%), percent S 16.0 (theory 16.9%).

EXAMPLE 14

Trichloroacetyl-perchlorovinyl disulfide (a) 10 grams (0.026 mole) of trichloroacetyl-1,2,2,2-tetrachloroethyl disulfide were dissolved in 100 ml. of petroleum ether and 2.6 grams (0.026 mole) of triethylamine in 20 ml. of petroleum ether added dropwise with stirring at −20° C. over a period of 30 minutes. Allowing the mixture to attain room temperature, filtration to remove triethylamine hydrochloride, followed by stripping in high vacuum of the filtrate gave 8.8 grams (quantitative yield) of trichloroacetyl-perchlorovinyl disulfide as an orange oil, $n_D^{25}$ 1.6066, percent Cl 52.2 (Theory 62.5%), percent S 17.7 (theory 18.8%).

(b) 9 grams (0.05 mole) of trichlorothiol acetic acid were dissolved in 100 ml. of water and 9 grams (0.045 mole) of perchlorovinyl sulfenyl chloride were added dropwise with rapid stirring and occasional cooling. The separating oil was collected, taken up in chloroform, dried over anhydrous magnesium sulfate and evaporated in high vacuum to give 12 grams (78% yield) of trichloroacetylperchlorovinyl disulfide, $n_D^{25}$ 1.6129.

EXAMPLE 15

Oxalyl bis(1,2,2-trichloroethyl disulfide)

10 grams (0.0505 mole) of bis(potassium thiol)oxalate were dispersed in 50 ml. of dry chloroform and 20.0 grams (0.10 mole) of 1,2,2-trichloroethyl sulfenyl chloride added to the suspension dropwise with stirring and cooling at 25–30° C. over a period of 30 minutes. At the end of the addition period, the mixture was free of unreacted sulfenyl chloride. A quantitative yield of potassium chloride as well as unused thiol oxalate was recovered by filtration. The filtrate was evaporated in high vacuum whereupon 21 grams of oxalyl bis(1,2,2-trichloroethyl disulfide) were obtained as a bright yellow oil, $n_D^{25}$ 1.5896.

EXAMPLE 16

Malonyl bis(1,2,2-trichloroethyl disulfide)

9.15 grams (0.043 mole) of bis(potassium thiol)malonate were suspended in chloroform and 17.3 grams (0.086 mole) of 1,2,2-trichloroethyl sulfenyl chloride were added dropwise with vigorous stirring at 30–35° C. over a period of 14 minutes. Agitation for a further 1 hour period, filtration and evaporation of the chloroform solution in vacuum gave 18 grams (90% yield) of malonyl bis(1,2,2-trichloroethyl disulfide) as a reddish oil, $n_D^{25}$ 1.6055, percent Cl 46.7 (theory 46.0).

EXAMPLE 17

Succinyl bis(1,2,2-trichloroethyl disulfide)

16.8 grams (0.084 mole) of 1,2,2-trichloroethyl sulfenyl chloride were added dropwise with vigorous stirring at 25–30° C. to a suspension of 10 grams (0.0442 mole) of bis(potassium thiol) succinate in 50 ml. of dry chloroform. At the end of the addition, the mixture was found to be free of unreacted sulfenyl chloride. Filtration and evaporation of the chloroform solution, finally in high vacuum gave 19 grams (95% yield) of succinyl bis(1,2,2-trichloroethyl disulfide) as a dark oil, $n_D^{25}$ 1.6612.

EXAMPLE 18

Benzoyl-1,2,2-trichloroethyl disulfide 14.8 grams (0.1 mole+1 gram excess) of thiol benzoic acid were dissolved in 50 ml. of anhydrous chloroform and 20 grams (0.1 mole) of 1,2,2-trichloroethyl sulfenyl chloride were added dropwise with stirring and cooling at 30–35° C. A vacuum of 200–300 mm. Hg was applied simultaneously in order to remove the gaseous HCl formed during the reaction. A color change of the dark solution sharply to a light yellow indicated the endpoint of the reaction. The chloroform solution was washed with dilute sodium bicarbonate and 3 times with water, dried over anhydrous magnesium sulfate and the solvent removed in a high vacuum. 30.0 grams (99.6% yield) of benzoyl-1,2,2-trichloroethyl disulfide were obtained as a yellow oil, $n_D^{20}$ 1.6325, percent Cl 34.25 (theory 35.4%), percent S 21.28 (theory 21.3%).

EXAMPLE 19

Benzoyl-2,2,2-trichloroethyl disulfide

To 13.8 grams (0.1 mole) of thiol benzoic acid in 50 ml. of chloroform there were added dropwise with stirring and occasional cooling 20 grams (0.1 mole) of 2,2,2-trichloroethyl sulfenyl chloride at 35–40° C. Two hours of additional stirring at room temperature completed the reaction. Washing with 0.1 molar sodium bicarbonate, three times with water, drying over anhydrous magnesium sulfate and stripping gave 29.5 grams (98% yield) of benzoyl-2,2,2-trichloroethyl disulfide as a faintly red oil which solidified on standing, M.P. 37–38° C.

EXAMPLE 20

Benzoyl-2,2-dichlorovinyl disulfide 15 grams (0.05 mole) of benzoyl-2,2,2-trichloroethyl disulfide were dissolved in 75 ml. of dry benzene. 5.1 grams (0.05 mole) of triethyl amine were then added dropwise with stirring and cooling at 25–30° C. Stirring for an additional three hours at room temperature and one hour at reflux and filtration gave a quantitative recovery of triethylamine hydrochloride. Removal of the solvent finally in high vacuum gave 14 grams (quantitative yield) of benzoyl-2,2-dichlorovinyl disulfide as a dark oil.

EXAMPLE 21

2,4-dichlorobenzoyl-1,2,2-trichloroethyl disulfide

To a solution of 25.85 grams (0.125 mole) of 2.4 dichlorothiol benzoic acid in 100 ml. of chloroform 25 grams (0.125 mole) of 1,2,2 - trichloroethyl sulfenyl chloride were added with stirring, simultaneously introducing dry nitrogen gas at 50–60° C. and maintaining a slow distillation rate to remove chloroform and gaseous HCl. After addition of the sulfenyl chloride was complete the distillation was accelerated and the residue obtained subjected to high vacuum to obtain 45 grams (97% yield) of 2,4-dichlorobenzoyl-1,2,2-trichloroethyl disulfide as a dark colored heavy oil, $n_D^{25}$ 1.6376, percent Cl 47.3 (theory 47.2%), percent S 15.5 (theory 17.1%).

EXAMPLE 22

2,4-dichlorobenzoyl-2,2,2-trichloroethyl disulfide 21 grams (0.1 mole) of 2,4-dichlorobenzoyl chloride were added dropwise with stirring to a solution of 12 grams (an excess) of pyridine in 150 ml. of dry chloroform saturated with $H_2S$ by continuous introduction of $H_2S$ gas. Throughout the reaction the temperature was maintained at 0–3° C. Stirring at room temperature for 30 minutes, pouring with agitation into 100 ml. of water containing 7 grams of concentrated sulfuric acid, separating of the chloroform layer, drying over anhydrous magnesium sulfate, diluting the chloroform solution to 250 ml. with fresh chloroform and concentrating in a vigorous dry nitrogen stream at approximately 50° C. gave 0.1 mole of 2,4-dichlorothiolbenzoic acid in chloroform (approximately 100 cc.) essentially free of hydrogen sulfide.

20 grams (0.1 mole) of 2,2,2-trichloroethyl sulfenyl chloride were then added to the thiol acid solution in chloroform at 30–35° C. with simultaneous agitation by means of a dry nitrogen stream. Stripping off the solvent directly, finally in high vacuum gave 35 grams (94.5% yield) of 2,4-dichlorobenzoyl-2,2,2-trichloroethyl disulfide as a thick oil, $n_D^{25}$ 1.6315, percent Cl 47.5 (theory 47.7%), percent S 16.4 (theory 17.1%).

EXAMPLE 23

2,4-dichlorobenzoyl-1,2,2,2-tetrachloroethyl disulfide

Dropwise addition of 29.4 grams (0.125 mole) of 1,2,2,2-tetrachloroethyl sulfenyl chloride to a solution of 25.8 grams (0.125 mole) of 2,4-dichlorothiolbenzoic acid in 100 ml. of dry chloroform with stirring at 50–60° C. with distilling of solvent and formed HCl in a dry nitrogen stream, after completed reaction and removal of all the solvent, finally in high vacuum gave 45 grams (90% yield) of 2,4-dichlorobenzoyl-1,2,2,2-tetrachloroethyl disulfide as a heavy dark colored oil, $n_D^{25}$ 1.6412, percent Cl 52.7 (theory 52.5%), percent S 14.9 (theory 15.7%).

EXAMPLE 24

2,4-dichlorobenzoyl-perchlorovinyl disulfide

To a hydrogen sulfide free solution in chloroform of 10.3 grams (0.05 mole) of 2,4-dichlorothiolbenzoic acid, there were added 9.7 grams (0.049 mole) of perchlorovinyl sulfenyl chloride with simultaneous distillation of solvent in a dry nitrogen stream. A quantitative yield of 2,4-dichlorobenzoyl-perchlorovinyl disulfide was obtained as a dark oil, $n_D^{25}$ 1.6550.

EXAMPLE 25

Phenylacetyl-1,2,2-trichloroethyl disulfide

To 19 grams (0.125 mole) of phenylthiol acetic acid in 150 ml. of chloroform there were added 25 grams (0.125 mole) of 1,2,2-trichloroethyl sulfenyl chloride dropwise with stirring at 50° C. and simultaneous slow distillation of solvent in a dry nitrogen stream. Complete removal of chloroform and the formed HCl first in a rapid nitrogen stream and finally in high vacuum gave 39.4 grams (99% yield) of phenylacetyl-1,2,2-trichloroethyl disulfide as a dark oil, $n_D^{25}$ 1.5945, percent Cl 33.8 (theory 33.7%), percent S 18.7 (theory 20.3%).

EXAMPLE 26

Phenylacetyl-1,2,2,2-tetrachloroethyl disulfide 19 grams (0.125 mole) of phenylthiol acetic acid in 150 ml. of chloroform were reacted with 29.6 grams (0.125 mole) of 1,2,2,2-tetrachloroethyl sulfenyl chloride using the procedure of Example 25. There were obtained 45 grams (99% yield) of phenylacetyl-1,2,2,2-tetrachloroethyl disulfide as a dark oil, $n_D^{25}$ 1.6012, percent Cl 39.7 (theory 40.5%).

EXAMPLE 27

2,4-dichlorophenylacetyl-1,2,2-trichloroethyl disulfide 6 grams (0.025 mole+10% excess) of 2,4-dichlorophenyl thiol acetic acid were dissolved in 50 ml. of chloroform and 5 grams (0.025 mole) of 1,2,2-trichloroethyl sulfenyl chloride added dropwise with stirring at 30–35° C. After a 30 minute heating period to 40–45° C., free sulfenyl chloride was absent in the resulting reaction mixture. Direct stripping in high vacuum gave 9.8 grams (98% yield) of 2,4-dichlorophenylacetyl-1,2,2-trichloroethyl disulfide as an oil, $n_D^{25}$ 1.6060, percent Cl 45.8 (theory 46.1%).

EXAMPLE 28

2,4-dichlorophenylacetyl-1,2,2,2-tetrachloroethyl disulfide 6 grams (0.025 mole+10% excess) of 2,4-dichlorophenyl thiol acetic acid were dissolved in 50 ml. of dry chloroform and 5.8 grams (0.025 mole) of 1,2,2,2-tetrachloroethyl sulfenyl chloride were added dropwise with stirring at 30–35° C. Additional heating at 40–45° C. for 30 minutes completed the reaction. Direct stripping of the solvent in high vacuum gave 9.9 grams (95% yield) of 2,4-dichlorophenylacetyl-1,2,2,2-tetrachloroethyl disulfide, $n_D^{28}$ 1.6087, percent Cl 50.4 (theory 50.7%).

Example 29

Phenoxyacetyl-1,2,2-trichloroethyl disulfide 18 grams (0.1 mole+5% excess) of phenoxyacetyl chloride were added dropwise to a solution of 12 grams of pyridine in 100 ml. of chloroform saturated with H₂S at 0° C. The addition of the reagent was carried out at a temperature of below 15° C. while a continued hydrogen sulfide gas stream was introduced in order to maintain an H₂S excess at all times, allowing the mixture to warm to room temperature, removing free pyridine and liberating the thiolic acid by washing with 200 ml. of water containing 5 grams of concentrated sulfuric acid, drying the chloroform solution over anhydrous magnesium sulfate and concentrating it to 50 cc. at 50° C. in a vigorous nitrogen stream giving a hydrogen sulfide free solution of phenoxythiol acetic acid in chloroform. 20 grams (0.1 mole) of 1,2,2-trichloroethyl sulfenyl chloride were then added dropwise at 30–40° C. with a slow stream of dry nitrogen in order to reduce the concentration of free HCl in the solution. Washing with dilute sodium bicarbonate and water, drying over anhydrous magnesium sulfate and removing the solvent in high vacuum gave 32 grams (96% yield) of phenoxyacetyl-1,2,2-trichloroethyl disulfide as a heavy dark oil which solidified on prolonged standing.

Example 30

2,4-dichlorophenoxyacetyl-1,2,2-trichloroethyl disulfide

A solution of 23.7 grams (0.1 mole) of 2,4-dichlorophenoxy acetic acid in 50 ml. of chloroform was reacted with 20 grams (0.1 mole) of 1,2,2-trichloroethyl sulfenyl chloride in the same manner as that employed in Example 29. Complete removal of solvent and HCl gave 36.0 grams (90% yield) of 2,4-dichlorophenoxyacetyl-1,2,2-trichloroethyl disulfide as a thick oil which solidified on standing, M.P. 66–67° C., percent Cl 43.6 (theory 44.3%).

Example 31

2-methyl-4-chlorophenoxyacetyl-1,2,2,2-tetrachloroethyl disulfide 21.9 grams (0.1 mole) of 2-methyl-4-chlorophenoxyacetyl chloride in 50 cc. of dry chloroform were added dropwise to a solution of 12 grams of pyridine in 100 ml. of chloroform saturated with H₂S gas at 0° C. The addition was carried out at below 15° C. with simultaneous introduction of a hydrogen sulfide stream in order to maintain an H₂S excess at all times. Washing of the reaction mixture with 200 ml. of water containing 5 grams of concentrated sulfuric acid, drying over magnesium sulfate and concentrating of the chloroform solution in a nitrogen stream and expelling of all of the free H₂S gas gave 50 ml. of a hydrogen sulfide free 2-methyl-4-chlorophenoxythiol acetic acid in chloroform. (The free isolated 2-methyl-4-chlorophenoxythiol actic acid had a M.P. of 82–83° C.) 23.4 grams (0.1 mole) of 1,2,2,2-tetrachloroethyl sulfenyl chloride were then added dropwise to the chloroform solution with simultaneous nitrogen stream agitation and chloroform distillation at approximately 50° C. Stripping finally in high vacuum gave 40 grams (97% yield) of 2-methyl-4-chlorophenoxyacetyl-1,2,2,2-tetrachloroethyl disulfide as a thick oil which solidified within 24 hours of standing. Purification of a small sample gave a M.P. of 87–88° C.

Example 32

Terephthalyl bis(1,2,2-trichloroethyl disulfide)

10.2 grams (a slight excess over 0.05 mole) of bis-(thiol)terephthalic acid was suspended in 100 ml. of dry chloroform and 20 grams (0.1 mole) of 2,2-trichloroethyl sulfenyl chloride were added dropwise with stirring at 30–35° C. Warming for a short period, with stirring, to 45° C. completed the reaction. A small amount of solid was removed by filtration, and direct vacuum stripping finally gave a yellow oil which crystallized by stirring in petroleum ether. 23 grams (88.5% yield) of terephthalyl bis(1,2,2-trichloroethyl disulfide) having the formula

was obtained as a faintly yellow solid, M.P. 68–70° C.

The compounds of the present invention can be used alone as pesticides but it has frequently been found desirable to apply them to the pest, e.g., to the soil habitat of nematodes, fungi or weeds, together with inert solids to form dusts, or more preferably suspended in a suitable liquid diluent preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, isopropanol and amyl alcohol, etc.

The novel pesticides can also be applied as aerosols, e.g., by dispersing them in air by means of a compressed gas such as dichlorodifluoromethane or trichlorofluoromethane and other Freons for example.

The pesticides of the present invention can also be applied with inert nematocidal, fungicidal, bactericidal or insecticidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionic, cationic or nonionic in charatcer.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenolethylene oxide condensation products, e.g., p-isooctyl phenol condensed with 10 ethylene oxide units, soaps, e.g., sodium stearate and potassium oleate, sodium salt of propylnaphthalene sulfonic acid, (di-2-ethyl hexyl)ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene ester of fatty acids and rosin acid, e.g., Ethofat 7 and 13, sodium N-methyl-N-oleyltaurate, Turkey red oil, sodium disbutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris-(polyoxyethylene)sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

In the following tables the disulfides of the invention were formulated (unless otherwise indicated) as wettable powders consisting of 50% disulfide, 46% Hi-sil 233 (ultrafine silica), 2% Marasperse N (sodium lignin sulfonate) and 2% Pluronic L-61 (polyethylene oxide-propylene oxide molecular weight about 1000). This wettable powder is hereinafter designated as Formulation A.

In the following tables the compound numbers correspond to the particular disulfide prepared in the examples of the same number, e.g., Compound 10 is butyryl-2,2,2-trichloroethyl disulfide.

In the following tables the effectiveness of the compounds was measured on a scale of 0 to 10 where 10 indicated 100% effectiveness and 0 indicated 0 effectiveness.

The saprophytic nematode tests of Table 1 were carried out in water as the medium with Panagrellus and Rhabditis spp. at room temperature. The results were recorded as amount of kill after a 4 days' incubation period. The rates of application are set forth in parts per million (p.p.m.)

TABLE 1

| Compound: | 400 | 200 | 100 | 50 | 25 | 12.5 |
|---|---|---|---|---|---|---|
| 1 | | | 10 | 10 | 10 | 8 | 
| 2 | | | 10 | 8 | 5 | 3 | 0 |
| 3 | | 10 | 10 | | 5 | | |
| 4 | | 10 | 10 | | 0 | | |
| 5 | | | 10 | 10 | 10 | 8 | 5 |
| 6 | | 10 | 10 | | | 10 | |
| 7 | | 10 | 10 | | 5 | | |
| 8 | | | 10 | 10 | 8 | 5 | 3 |
| 9 | | 10 | 10 | | 10 | | |
| 10 | | | 5 | 3 | 0 | 0 | 0 |
| 11 | | 10 | 8 | | 8 | | |
| 12 | | 10 | 3 | | 0 | | |
| 13 | | 0 | 0 | | 0 | | |
| 14 | | 5 | 1 | | | 1 | |
| 15 | | 10 | 10 | | | 8 | |
| 16 | | 10 | 10 | | | 8 | |
| 17 | | 10 | 5 | | | 3 | |
| 18 | | | 5 | 3 | 0 | 0 | 0 |
| 19 | | | 5 | 3 | 0 | 0 | 0 |
| 20 | | 10 | 10 | | 10 | | |
| 21 | | 5 | 0 | | 0 | | |
| 22 | | 1 | 1 | | | 1 | |
| 23 | | 5 | 0 | | 0 | | |
| 24 | | 1 | 1 | | | 1 | |
| 25 | | 5 | 0 | | 0 | | |
| 26 | | 0 | 0 | | 0 | | |
| 27 | | 5 | 1 | | | 1 | |
| 28 | | 5 | 1 | | | 1 | |
| 29 | | 8 | 5 | | | 1 | |
| 30 | | 5 | 0 | | 0 | | |
| 31 | | 1 | 1 | | | 1 | |
| 32 | | 0 | 0 | | 0 | | |

The compounds were also tested as fungicides in plate fungicide tests as indicated in Table 2. The compounds were made up into Formulation A and then added to agar cultures of the fungi. In Table 2, P stands for Pythium spp., R for Rhizoctonia, H for Helminthosporium, F for Fusarium, V for *Verticillium albo-cetrum* and C for *Colletotrichum obiculare*. The rates of application are set forth in p.p.m.

TABLE 2

| Compound | P 500 | P 100 | P 10 | H 500 | H 100 | H 10 | R 500 | R 100 | R 10 | F 500 | F 100 | F 10 | V 500 | V 100 | V 10 | C 500 | C 100 | C 10 |
|---|---|---|---|---|---|---|---|---|---|---|---|---|---|---|---|---|---|---|
| 1 | 10 | 5 | 0 | 10 | 10 | 8 | 10 | 5 | 0 | 10 | 10 | 5 | | | | | | |
| 2 | 5 | 0 | 0 | 10 | 10 | 5 | 10 | 0 | 0 | 10 | 0 | 0 | | | | | | |
| 3 | | | | 10 | 5 | 0 | 10 | 5 | 0 | 10 | 8 | 5 | 10 | 10 | 0 | 10 | 5 | 0 |
| 4 | | | | 10 | 10 | 5 | 10 | 10 | 5 | 10 | 10 | 5 | 10 | 10 | 5 | 10 | 10 | 5 |
| 5 | 10 | 8 | 5 | 10 | 10 | 5 | 10 | 10 | 10 | 10 | 10 | 8 | | | | | | |
| 6 | | | | 10 | 10 | 0 | 10 | 10 | 5 | 10 | 8 | 5 | 10 | 8 | 0 | 10 | 8 | 2 |
| 7 | | | | 10 | 10 | 0 | 10 | 10 | 0 | 10 | 10 | 5 | 10 | 10 | 5 | 10 | 10 | |
| 8 | 5 | 0 | 0 | 10 | 10 | 0 | 10 | 0 | 0 | 10 | 5 | 0 | | | | | | |
| 9 | | | | 10 | 10 | 0 | 10 | 10 | 0 | 10 | 10 | 5 | 10 | 10 | 10 | 10 | 10 | 0 |
| 10 | 5 | 0 | 0 | 10 | 10 | 0 | 10 | 0 | 0 | 10 | 0 | 0 | | | | | | |
| 11 | | | | 10 | 10 | 0 | 10 | 10 | 5 | 10 | 10 | 5 | 10 | 10 | 5 | 10 | 8 | 0 |
| 12 | | | | 5 | 0 | 0 | 10 | 5 | 0 | 10 | 5 | 5 | 10 | 5 | 0 | 5 | 0 | 0 |
| 13 | | | | 8 | 5 | 0 | 8 | 5 | 0 | 8 | 5 | 0 | 10 | 0 | 0 | 8 | 5 | 0 |
| 14 | | | | 5 | 5 | 0 | 5 | 5 | 5 | 5 | 5 | 2 | 8 | 5 | 0 | 8 | 5 | 0 |
| 15 | | | | 10 | 10 | 5 | 10 | 10 | 10 | 10 | 10 | 10 | 10 | 10 | 10 | 10 | 10 | 8 |
| 16 | | | | 10 | 10 | 5 | 10 | 10 | 5 | 10 | 10 | 5 | 10 | 10 | 5 | 10 | 10 | 5 |
| 17 | | | | 10 | 10 | 8 | 10 | 10 | 10 | 10 | 10 | 8 | 10 | 10 | 10 | 10 | 10 | 10 |
| 18 | 10 | 0 | 0 | 10 | 10 | 8 | 5 | 0 | 0 | 10 | 5 | 0 | | | | | | |
| 19 | 5 | 0 | 0 | 5 | 5 | 0 | 5 | 0 | 0 | 5 | 0 | 0 | | | | | | |
| 20 | | | | 8 | 5 | 0 | 10 | 10 | 5 | 10 | 10 | 8 | 10 | 10 | 8 | 10 | 10 | 8 |
| 21 | | | | 10 | 8 | 0 | 5 | 5 | 0 | 8 | 5 | 0 | 10 | 8 | 0 | 5 | 5 | 0 |
| 22 | | | | 5 | 5 | 0 | 8 | 5 | 5 | 5 | 5 | 0 | 5 | 5 | 0 | 5 | 0 | 0 |
| 23 | | | | 5 | 5 | 0 | 5 | 0 | 0 | 5 | 5 | 0 | 7 | 5 | 0 | 5 | 0 | 0 |
| 24 | | | | 8 | 5 | 0 | 8 | 0 | 0 | 5 | 5 | 0 | 8 | 5 | 0 | 5 | 0 | 0 |
| 25 | | | | 8 | 8 | 0 | 10 | 10 | 5 | 10 | 8 | 8 | 10 | 8 | 5 | 8 | 5 | 0 |
| 26 | | | | 8 | 5 | 0 | 8 | 5 | 5 | 8 | 5 | 0 | 8 | 5 | 0 | 8 | 5 | 0 |
| 27 | | | | 10 | 5 | 0 | 10 | 10 | 5 | 10 | 10 | 5 | 10 | 8 | 5 | 10 | 8 | 5 |
| 28 | | | | 8 | 5 | 0 | 10 | 8 | 5 | 10 | 8 | 5 | 10 | 5 | 0 | 8 | 5 | 0 |
| 29 | | | | 10 | 8 | 5 | 10 | 10 | 5 | 10 | 10 | 5 | 10 | 10 | 8 | 10 | 8 | 5 |
| 30 | | | | 7 | 5 | 0 | 5 | 5 | 0 | 8 | 8 | 5 | 10 | 10 | 5 | 5 | 5 | 0 |
| 31 | | | | 8 | 5 | 0 | 10 | 8 | 5 | 5 | 5 | 2 | 8 | 2 | 0 | 8 | 5 | 0 |
| 32 | | | | 5 | 0 | 0 | 5 | 3 | 0 | 5 | 3 | 0 | 5 | 0 | 0 | 5 | 0 | 0 |

Furthermore the compounds were tested as soil fungicides as indicated in Table 3. The compounds were made up into Formulation A and a pot of soil infested with *Pythium irr.* was treated with the indicated dosage of the chemical in lbs./acre, and the emergence of pea seeds planted in the soil was noted.

TABLE 3

| Compound | 200 | 50 | Compound | 200 | 50 |
|---|---|---|---|---|---|
| 1 | 9 | 4 | 17 | 6 | 0 |
| 2 | 6 | 3 | 18 | 8 | 3 |
| 3 | 0 | 0 | 19 | 3 | 3 |
| 4 | 4 | 0 | 20 | 0 | 0 |
| 5 | | | 21 | 0 | 0 |
| 6 | 0 | 0 | 22 | 0 | 0 |
| 7 | 8 | 0 | 23 | 0 | 0 |
| 8 | 5 | 4 | 24 | 0 | 0 |
| 9 | 9 | 0 | 25 | 7 | 0 |
| 10 | 5 | 5 | 26 | 7 | 0 |
| 11 | 3 | 1 | 27 | 0 | 0 |
| 12 | 5 | 0 | 28 | 0 | 0 |
| 13 | 0 | 0 | 29 | 0 | 0 |
| 14 | 0 | 0 | 30 | 0 | 0 |
| 15 | 4 | 0 | 31 | 0 | 0 |
| 16 | 0 | 0 | 32 | 2 | 0 |

The compounds were further tested as fungicides in spore germination tests as indicated in Table 4. The compounds were employed in Formulation A and tested against Alternaria and Ustilago at the indicated dosages in p.p.m.

TABLE 4

| | Alternaria | | | Ustilago | | |
|---|---|---|---|---|---|---|
| Compound | 1,000 | 100 | 10 | 1,000 | 100 | 10 |
| 1 | 10 | 10 | 0 | 10 | 10 | 0 |
| 2 | 10 | 0 | 0 | 10 | 0 | 0 |
| 3 | 10 | 4 | 0 | 2 | 0 | 0 |
| 4 | 8 | 8 | 0 | 5 | 0 | 0 |
| 5 | 10 | 5 | 0 | 10 | 0 | 0 |
| 6 | | | | | | |
| 7 | 10 | 10 | 8 | 10 | 10 | 4 |
| 8 | 10 | 0 | 0 | 10 | 0 | 0 |
| 9 | 10 | 10 | 8 | 10 | 10 | 4 |
| 10 | 10 | 0 | 0 | 10 | 0 | 0 |
| 11 | 2 | 0 | 0 | 0 | 0 | 0 |
| 12 | 2 | 0 | 0 | 0 | 0 | 0 |
| 13 | 2 | 0 | 0 | 0 | 0 | 0 |
| 14 | | | | | | |
| 15 | | | | | | |
| 16 | | | | | | |
| 17 | | | | | | |
| 18 | 10 | 10 | 0 | 10 | 10 | 0 |
| 19 | 5 | 0 | 0 | 0 | 0 | 0 |
| 20 | 10 | 6 | 0 | 5 | 0 | 0 |
| 21 | 8 | 5 | 5 | 8 | 0 | 0 |
| 22 | | | | | | |

TABLE 4—Continued

| | Alternaria | | | Ustilago | | |
|---|---|---|---|---|---|---|
| Compound | 1,000 | 100 | 10 | 1,000 | 100 | 10 |
| 23 | 5 | 0 | 0 | 5 | 0 | 0 |
| 24 | | | | | | |
| 25 | 8 | 5 | 0 | 8 | 0 | 0 |
| 26 | 10 | 0 | 0 | 5 | 0 | 0 |
| 27 | | | | | | |
| 28 | | | | | | |
| 29 | | | | | | |
| 30 | 5 | 0 | 0 | 0 | 0 | 0 |
| 31 | | | | | | |
| 32 | 10 | 5 | 0 | 8 | 5 | 0 |

The compounds were tested as defoliants as set forth in Table 5. The compounds were made up into Formulation A and tested at the indicated rates in lbs./acre as defoliants for cotton leaves.

TABLE 5

| Compound | 8 | 2 | Compound | 8 | 2 |
|---|---|---|---|---|---|
| 1 | 3 | 2 | 17 | 0 | 0 |
| 2 | 4 | 0 | 18 | 3 | 2 |
| 3 | 0 | 0 | 19 | 5 | 3 |
| 4 | 0 | 0 | 20 | 1 | 1 |
| 5 | 5 | 2 | 21 | 3 | 3 |
| 6 | 0 | 0 | 22 | 0 | 0 |
| 7 | 1 | 0 | 23 | 0 | 0 |
| 8 | 1 | 2 | 24 | 0 | 0 |
| 9 | 1 | 0 | 25 | 5 | 4 |
| 10 | 2 | 2 | 26 | 0 | 0 |
| 11 | 1 | 0 | 27 | 1 | 1 |
| 12 | 0 | 0 | 28 | 0 | 0 |
| 13 | 1 | 0 | 29 | 2 | 2 |
| 14 | 0 | 0 | 30 | 0 | 0 |
| 15 | 1 | 0 | 31 | 2 | 3 |
| 16 | 2 | 0 | 32 | 1 | 0 |

Benzoyl 2,2,2-trichloroethyl disulfide was 90% as effective as DEF as a defoliant, phenyl acetyl 1,2,2-trichloroethyl disulfide was 100% as effective as DEF and 2,4 - dichlorobenzoyl - 1,2,2 - trichloroethyl disulfide was 80% as effective as DEF. DEF is S,S,S-tributyl trithiophosphate and is one of the best of the commercially available defoliants.

The compounds were tested as preemergent herbicides as set forth in Table 6. The compounds were made up into Formulation A and applied prior to emergence to soil planted with the indicated seeds and tested at the indicated rates in lbs./acre.

TABLE 6

|  | Oats | | Sugar Beets | | Radish | | Flax | | Wheat | |
|---|---|---|---|---|---|---|---|---|---|---|
|  | 8 | 2 | 8 | 2 | 8 | 2 | 8 | 2 | 8 | 2 |
| Compound: | | | | | | | | | | |
| 1 | 0 | 0 | 5 | 5 | 0 | 0 | 0 | 0 | 0 | 0 |
| 2 | 2 | 0 | 6 | 6 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 0 | 0 | 0 | 0 | 0 | 0 | 0 | 0 |
| 11 | 6 | 7 | 2 | 0 | 0 | 0 | 3 | 0 | 9 | 7 |
| 12 | 8 | 7 | 0 | 0 | 0 | 0 | 0 | 0 | 4 | 8 |
| 13 | 8 | 3 | 0 | 0 | 0 | 0 | 3 | 0 | 9 | 8 |
| 14 | 5 | 7 | 3 | 2 | 1 | 0 | 0 | 0 | 9 | 8 |
| 15 | 0 | 0 | 0 | 0 | 2 | 0 | 0 | 0 | 0 | 0 |
| 16 | 0 | 0 | 0 | 0 | 0 | 0 | 0 | 0 | 0 | 0 |
| 17 | 0 | 0 | 0 | 0 | 0 | 0 | 0 | 0 | 0 | 0 |
| 18 | 3 | 0 | 5 | 3 | 0 | 0 | 0 | 0 | 0 | 0 |
| 19 | 0 | 0 | 0 | 0 | 0 | 0 | 0 | 0 | 0 | 0 |
| 20 | 0 | 0 | 0 | 0 | 0 | 0 | 0 | 0 | 0 | 0 |
| 21 | 0 | 0 | 0 | 0 | 0 | 0 | 0 | 0 | 0 | 0 |
| 22 | 0 | 0 | 0 | 0 | 0 | 0 | 0 | 0 | 0 | 0 |
| 23 | 0 | 0 | 7 | 0 | 8 | 0 | 4 | 0 | 1 | 0 |
| 24 | 0 | 0 | 0 | 0 | 2 | 0 | 0 | 0 | 0 | 0 |
| 25 | 0 | 0 | 0 | 0 | 0 | 0 | 0 | 0 | 0 | 0 |
| 26 | 0 | 0 | 0 | 0 | 0 | 0 | 0 | 0 | 0 | 0 |
| 27 | 3 | 1 | 7 | 3 | 7 | 5 | 7 | 6 | 0 | 0 |
| 28 | 1 | 0 | 3 | 0 | 8 | 6 | 7 | 0 | 0 | 0 |
| 29 | 2 | 0 | 9 | 0 | 10 | 0 | 5 | 0 | 0 | 0 |
| 30 | 4 | 1 | 9 | 9 | 9 | 9 | 9 | 9 | 8 | 7 |
| 31 | 7 | 6 | 10 | 10 | 10 | 10 | 9 | 9 | 7 | 6 |
| 32 | 0 | 0 | 6 | 0 | 6 | 0 | 6 | 0 | 3 | 0 |

Also the compounds were tested as post emergent herbicides as set forth in Table 7. The compounds were made up into Formulation A and applied to the indicated growing plants and tested at the indicated rates in lbs./acre.

TABLE 7

|  | Oats | | Sugar Beets | | Radish | | Flax | | Wheat | |
|---|---|---|---|---|---|---|---|---|---|---|
|  | 8 | 2 | 8 | 2 | 8 | 2 | 8 | 2 | 8 | 2 |
| Compound: | | | | | | | | | | |
| 1 | 10 | 6 | 9 | 4 | 7 | 6 | 7 | 6 | 4 | 3 |
| 2 | 10 | 3 | 8 | 1 | 9 | 2 | 7 | 0 | 6 | 1 |
| 3 | 5 | 2 | 7 | 6 | 6 | 3 | 1 | 1 | 3 | 1 |
| 4 | 3 | 3 | 8 | 5 | 6 | 3 | 6 | 1 | 3 | 1 |
| 5 | 4 | 3 | 8 | 3 | 7 | 2 | 6 | 3 | 3 | 3 |
| 6 | 3 | 0 | 7 | 4 | 7 | 3 | 3 | 0 | 3 | 0 |
| 7 | 4 | 1 | 7 | 5 | 6 | 4 | 7 | 4 | 3 | 2 |
| 8 | 10 | 4 | 10 | 3 | 9 | 2 | 10 | 3 | 10 | 1 |
| 9 | 2 | 1 | 8 | 6 | 7 | 6 | 7 | 2 | 3 | 1 |
| 10 | 10 | 5 | 10 | 4 | 8 | 3 | 9 | 3 | 6 | 2 |
| 11 | 3 | 2 | 9 | 6 | 7 | 6 | 4 | 6 | 2 | 1 |
| 12 | 4 | 0 | 7 | 2 | 6 | 2 | 3 | 2 | 6 | 4 |
| 13 | 1 | 0 | 4 | 4 | 4 | 2 | 3 | 0 | 6 | 3 |
| 14 | 1 | 1 | 5 | 4 | 2 | 3 | 3 | 0 | 7 | 5 |
| 15 | 0 | 1 | 3 | 4 | 1 | 1 | 0 | 0 | 0 | 0 |
| 16 | 0 | 3 | 4 | 4 | 1 | 2 | 0 | 0 | 0 | 1 |
| 17 | 0 | 0 | 4 | 3 | 3 | 0 | 1 | 0 | 0 | 0 |
| 18 | 9 | 4 | 2 | 4 | 5 | 5 | 4 | 4 | 10 | 4 |
| 19 | 10 | 6 | 9 | 7 | 9 | 3 | 10 | 4 | 8 | 2 |
| 20 | 1 | 3 | 7 | 7 | 7 | 5 | 7 | 1 | 3 | 0 |
| 21 | 3 | 1 | 7 | 6 | 6 | 3 | 3 | 0 | 6 | 4 |
| 22 | 3 | 0 | 7 | 4 | 2 | 3 | 5 | 0 | 3 | 0 |
| 23 | 5 | 1 | 7 | 4 | 7 | 4 | 7 | 0 | 3 | 1 |
| 24 | 3 | 0 | 6 | 4 | 5 | 4 | 5 | 2 | 3 | 1 |
| 25 | 3 | 3 | 6 | 6 | 6 | 6 | 4 | 3 | 3 | 0 |
| 26 | 1 | 1 | 5 | 6 | 4 | 4 | 3 | 3 | 1 | 0 |
| 27 | 3 | 0 | 4 | 3 | 3 | 1 | 6 | 1 | 1 | 0 |
| 28 | 0 | 0 | 4 | 5 | 5 | 3 | 5 | 2 | 0 | 0 |
| 29 | 0 | 0 | 6 | 3 | 8 | 4 | 3 | 1 | 0 | 1 |
| 30 | 3 | 1 | 10 | 9 | 9 | 7 | 8 | 7 | 6 | 4 |
| 31 | 3 | 0 | 8 | 7 | 9 | 9 | 9 | 7 | 0 | 1 |
| 32 | 1 | 0 | 3 | 3 | 2 | 3 | 4 | 0 | 1 | 1 |

As can be seen from Tables 6 and 7, many of the compounds act as selective herbicides. The compounds of the invention for the most part exhibit their greatest utility as fungicides and herbicides.

As used in the claims the terms "chlorophenoxy," "chlorophenyl" and "chloroalkyl" include both mono and polychlorine containing groups.

What is claimed is:

1. A compound having a formula selected from the group consisting of

and

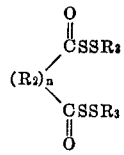

where R is selected from the group consisting of 1 to 17 carbon atoms alkyl, chloromethyl, phenyl, phenyl methyl, phenyl ethyl, phenoxymethyl, chlorophenyl, methylchlorophenyl, chlorophenyl methyl, chlorophenoxy methyl and methylchlorophenoxy methyl; $R_1$ is selected from the group consisting of dichlorovinyl and trichlorovinyl; $R_2$ is selected from the group consisting of alkylene of 1 to 4 carbon atoms and phenylene; $R_3$ is selected from the group consisting of trichloroethyl, tetrachloroethyl, dichlorovinyl and trichlorovinyl; and $n$ is selected from the group consisting of 0 and 1.

2. A compound according to claim 1 having the formula

3. A compound according to claim 2 where R is lower alkyl and $R_1$ is di to trichlorovinyl.

4. A compound according to claim 1 having the formula

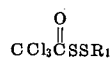

5. A compound according to claim 1 which is benzoyl polychlorovinyl disulfide.

6. A compound according to claim 1 which is a chlorobenzoyl polychlorovinyl disulfide.

7. A compound according to claim 1 which is phenylacetyl polychlorovinyl disulfide.

8. A compound according to claim 1 which is a chlorophenylacetyl polychlorovinyl disulfide.

9. A compound according to claim 1 which is a phenoxyacetyl polychlorovinyl disulfide.

10. A compound according to claim 1 which is a chlorophenoxyacetyl polychlorovinyl disulfide.

11. A compound according to claim 1 which is a 2-methyl-4-chlorophenoxyacetyl polychlorovinyl disulfide.

12. A compound according to claim 1 having the formula

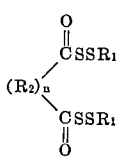

13. A compound according to claim 12 where $n$ is zero.

14. A compound according to claim 12 where $n$ is one and $R_2$ is an alkylene group having 1 to 2 carbon atoms.

15. A compound according to claim 1 which is oxalyl bis(polychloroethyl disulfide) wherein both chloroethyl groups have 3 to 4 chlorine atoms.

16. A compound according to claim 1 which is oxalyl bis(polychlorovinyl disulfide).

17. A compound according to cliam 1 which is an alkylene bis(polychloroethyl disulfide) wherein the alkylene group has 1 to 2 carbon atoms and both chloroethyl groups have 3 to 4 chlorine atoms.

18. A compound according to claim 1 which is an alkylene bis(polychlorovinyl disulfide) wherein the alkylene group has 1 to 2 carbon atoms.

19. A compound according to claim 1 which is a phthalyl bis(polychloroethyl disulfide) or a phthalyl bis(polychlorovinyl disulfide).

References Cited

UNITED STATES PATENTS 2,553,777  5/1951  Hawley et al. _____ 167—22
3,141,045  7/1964  Aichenegg et al. _____ 260—608

FOREIGN PATENTS 1,219,925  6/1966  Germany.

OTHER REFERENCES

Derwent: Belgian Patent Report, number 41, 1963, general organic division, page 1.

CHARLES B. PARKER, *Primary Examiner.*

S. T. LAWRENCE III, *Assistant Examiner.*

U.S. Cl. X.R.

260—502.6; 71—98; 424—298, 336